(12) United States Patent
Ishida et al.

(10) Patent No.: US 6,759,604 B2
(45) Date of Patent: Jul. 6, 2004

(54) SEAT LOAD MEASURING SYSTEM WITH ZERO POINT-ADJUSTING CAPABILITY

(75) Inventors: Shoichi Ishida, Oobu (JP); Tadashi Ozaki, Gamagoori (JP)

(73) Assignee: Denso Corporation, Kariya (JP)

( * ) Notice: Subject to any disclaimer, the term of this patent is extended or adjusted under 35 U.S.C. 154(b) by 79 days.

(21) Appl. No.: 10/151,995

(22) Filed: May 22, 2002

(65) Prior Publication Data

US 2003/0000757 A1 Jan. 2, 2003

(30) Foreign Application Priority Data

Jun. 28, 2001 (JP) ........................................ 2001-196790

(51) Int. Cl.$^7$ .......................... G01G 23/01; B60R 21/32
(52) U.S. Cl. .......................... 177/144; 701/45; 702/101; 180/273; 280/735; 73/1.13
(58) Field of Search .......................... 177/50, 144, 136, 177/210 R; 701/45; 702/101, 102; 180/273; 280/735; 73/1.13, 1.15

(56) References Cited

U.S. PATENT DOCUMENTS 5,971,432 A 10/1999 Gagnon et al. ............ 280/735
6,039,344 A 3/2000 Mehney et al. ............ 280/735

FOREIGN PATENT DOCUMENTS

| EP | 0 990 565 A1 | 4/2000 |
| JP | A 11-1153 | 1/1999 |

*Primary Examiner*—Randy W. Gibson
(74) *Attorney, Agent, or Firm*—Oliff & Berridge, PLC

(57) ABSTRACT

A seat load measuring system for use in a vehicle occupant protection device for a vehicle seat has a zero point adjusting capability. The seat load measuring system comprises four weight sensor assemblies; a hub assembly for collecting the weight sensor outputs and providing an output determined by the weight sensor outputs; and means for communicating a user's desire for a zero point adjustment to each weight sensor assembly. Each weight sensor assembly includes a zero point adjusting section, which receives an output from the communication means for executing a zero point adjusting operation. If a zero point of a weight sensor assembly is not within a predetermined range, the zero point adjusting section may providing an alert. A zero point adjusting command may be entered by a command input device and passed to the zero point adjusting section. Alternatively, the zero point adjustment may be initiated through a momentary switch provided in the hub assembly.

5 Claims, 4 Drawing Sheets

TO AND FROM VEHICLE OCCUPANT PROTECTION SYSTEM SUCH AS AIR BAG SYSTEM 4

SEAT LOAD MEASURING SYSTEM WITH ZERO POINT-ADJUSTING CAPABILITY

BACKGROUND OF THE INVENTION

1. Field of the Invention

The invention relates to a seat load measuring system for use in a vehicle occupant protection device for securing the safety of a vehicle occupant and for measuring a seat load a vehicle seat bears or the weight of the occupant of a vehicle seat.

2. Description of the Prior Art

Vehicles have become equipped with seat belt systems and air bag systems as vehicle occupant protection devices. In order to enhance the performance of such devices, attempts are being made to control the operation of each vehicle occupant protection device in response to the weight of the occupant of a vehicle seat equipped with the vehicle occupant protection device as well as a detection of the occurrence of a vehicle crash. For example, the quantity of air bag deploying gas, the deploying speed of air bags and/or the pretension of seat belts are controlled in response to the occupant's weight.

The present invention relates to vehicle seat load or occupant's weight measuring systems used in vehicle occupant protection devices as mentioned above. For example, three of such seat load measuring systems are disclosed in European Patent EP0990565 and U.S. Pat. Nos. 6,039,344 and 5,971,432.

Generally, a seat load measuring system provided for a vehicle seat comprises four weight sensor assemblies and a hub assembly for collecting the weight sensor assembly outputs and providing an output signal determined by the weight of the occupant of the vehicle seat. FIG. 1 is a diagram showing a conventional way of determining the seat load component $W_{LD}$ posed on each of the weight sensors from the output W of the weight sensor.

In FIG. 1, the horizontal axis indicates time and the vertical axis indicates the output W of the weight sensor. It is assumed in this figure that the used sensors are capable of measuring not only the pressure (i.e., the positive pressing force forward the sensor) but also the negative pressure or the tension. The least upper bound and the greatest lower bound of the weight sensor output are indicated by dotted lines Wmax and Wmin, respectively. A weight level W0 indicates the output level of a weight sensor assembly measured without applying any load thereto. After installing a seat assembly that includes the seat load measuring system in a vehicle under manufacturing, the output W0+W1 of each weight sensor assembly that includes a seat weight component W1 applied to the weight sensor assembly, is stored as a zero-point in the weight measuring hub assembly. Thereafter, the seat load (i.e., the load applied to a seat) is obtained by summing up seat load components given by the four weight sensor assemblies used for the seat. The seat load component for each weight sensor assembly is calculated as W−(W0+W1) from the output W of the sensor assembly and the stored zero-point W0+W1 for the sensor assembly.

However, the zero point of one or more weight sensor assembly may deviate far from the stored value W0+W1 to a value W0+W2 due to any cause such as a minor crash or distortion of any rigid member of the seat that is caused by the lowering of durability. In such a case, the inability to adjust the zero-point in conventional seat load measuring system results in the seat load component being still determined by the expression WW−(W0+W1) using the old correction value W1. Further, if the deviation W2 is too large, which means that the positive dynamic range (PDR) is narrower than a necessary range, then the output of the weight sensor may be saturated for a large load. In this case, the seat assembly needs a disassembly and adjustment or the substitution of a new one.

Therefore, what is needed is a seat load measuring system that provides an accurate seat load measurement by adjusting its zero point even when the zero point has significantly deviated.

What is further needed is a seat load measuring system that alerts the user if the zero point deviation exceeds a predetermined value.

SUMMARY OF THE INVENTION

According to an aspect of the invention, a seat load measuring system which is for use in a vehicle occupant protection device for a vehicle seat and which has a zero point adjusting capability is provided. The seat load measuring system comprises a plurality of weight sensor assemblies each for providing a first output indicative of a weight component of an occupant of the vehicle seat which component is applied to the weight sensor assembly; a hub assembly for collecting the first outputs and providing a second output determined by the first outputs; and means for communicating a user's desire for a zero point adjustment to each of the weight sensor assemblies. Each weight sensor assembly includes a zero point adjusting section, which receives an output from the communication means for executing a zero point adjusting operation.

The predetermined zero adjusting operation includes providing an alert if a zero point of the weight sensor assembly is not within a predetermined range.

The user's desire for a zero point adjustment may be communicated to the zero point adjusting section by using an input device for permitting the user to enter a predetermined command; and portions distributed in the hub assembly and each weight sensor assembly for transferring the predetermined command to the means for executing a predetermined zero adjusting operation.

Alternatively, the user's desire for a zero point adjustment may be communicated to the zero point adjusting section by using a momentary switch provided in the hub assembly; and portions distributed in the hub assembly and each weight sensor assembly for transferring the operation state of the momentary switch to the zero point adjusting section.

BRIEF DESCRIPTION OF THE DRAWING

Further objects and advantages of the present invention will be apparent from the following description of the preferred embodiments of the invention as illustrated in the accompanying drawing, in which.

Throughout the drawing, the same elements when shown in more than one figure are designated by the same reference numerals.

DETAILED DESCRIPTION OF THE PREFERRED EMBODIMENTS

Figure 1:
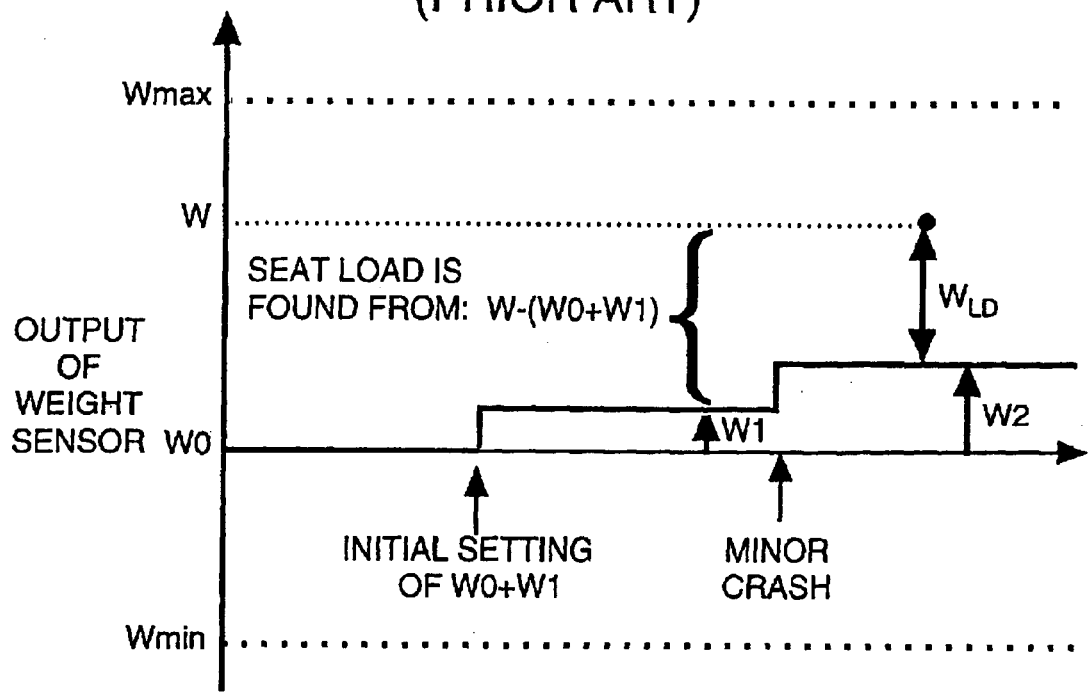
FIG. 1 is a diagram showing a conventional way of determining the seat load component $W_{LD}$ posed on each of the weight sensors from the output W of the weight sensor.
Figure 2:
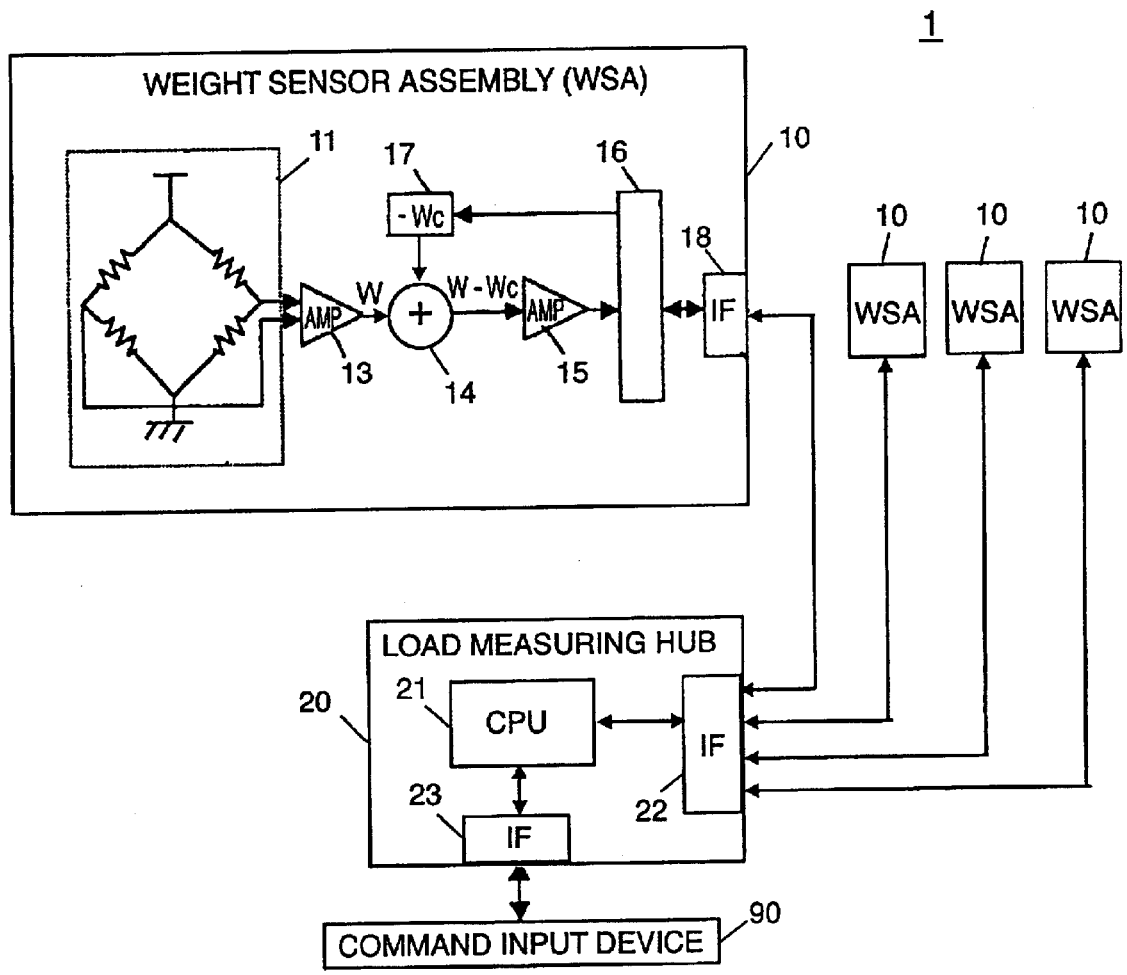
FIG. 2 is a block diagram showing a first exemplary zero point adjusting arrangement using a seat load measuring system capable of adjusting its zero point in accordance with a first illustrative embodiment of the invention.

FIG. 2 is a block diagram showing a first exemplary zero point adjusting arrangement 1 using a seat load measuring system (10+20) which is capable of adjusting its zero point in accordance with a first illustrative embodiment of the invention. In the zero point adjusting arrangement 1 of FIG. 1, command input device 90 from which a service person enters a zero point-adjustment command is connected with a seat load measuring system which comprises four weight sensor assemblies 10 and seat load measuring hub assembly 20. Command input device 90 is preferably a microprocessor-based maintenance service tool with data input and output portions. Weight sensor assemblies 10 are attached to a seat assembly (not shown), while seat load measuring hub assembly 20 is provided within the vehicle chamber: e.g., on the not-shown seat assembly or a vehicle floor (not shown) in a well-known manner.

Each weight sensor assembly 10 comprises weight sensor 11 for generating an output voltage depending on the pressure or tension applied thereto; amplifier (AMP.) 13 for amplifying the output voltage from weight sensor 11 to an appropriate level W; memory 17 for storing a sign-inverted correction value (−Wc) for use in the correction of the sensor 11 output voltage; adder 14 for adding the sign-inverted correction value −Wc to the sensor 11 output voltage; amplifier (AMP.) 15 for amplifying the adder 14 output; controller 16 for performing a zero point adjustment as detailed below; and communication interface (IF) 18 for communicating with seat load measuring hub assembly 20.

Weight sensor 11 comprises a bridge circuit of four strain gages with two opposing nodes supplied with a constant voltage. An output voltage is given by the other two opposing nodes of the bridge circuit. The strain gages may be any of semiconductor strain gages, Cu—Ni strain gages, etc. Applying a pressure to a weight sensor causes the resistances of the strain gages (i.e., the balance of the bridge circuit) to vary, resulting in a change in the output of the weight sensor 11. Since the sensor 11 output voltage is vary small, amplifier 13 is preferably inserted just after weight sensor 11, which enhances the signal-to-noise ratio of the amplifier 13 output W.

The correction value Wc is equal to no-load weight sensor 11 output W0 plus seat weight component W1, i.e., W0+W1. It should be noted that adder 14 may be replaced with a subtracter and the correction value Wc instead of the sign-inverted correction value −Wc may be stored in the memory 17.

Seat load measuring hub assembly 20 comprises communication interface (IF) 22 for communicating with four weight sensor assemblies 10 or their communication interfaces 18; CPU 21 for providing an output signal based on the weight of the seat load; and interface 23 for communicating with command input device 90. CPU 21 collects the output signals from the four weight sensor assemblies 10 via interface 22 and provides a piece of information determined on the basis of the sensor assemblies 10 output signals. The piece of information may be indicative of the seat load status, which is, for example, one of adult, child and unoccupancy.

Figure 3:
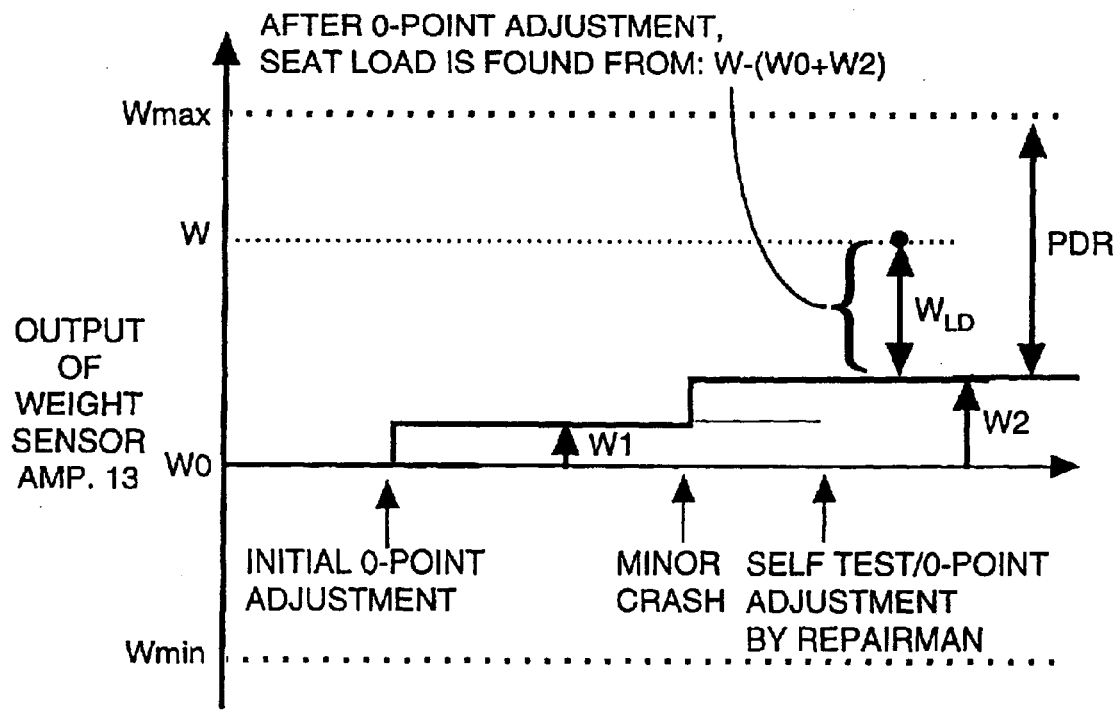
FIG. 3 is a diagram for illustrating the principles of the invention.
Figure 4:
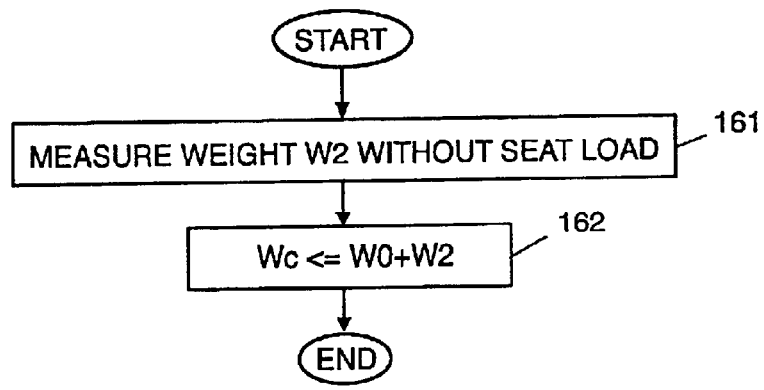
FIG. 4 is a flowchart showing a zero point adjusting operation executed by CPU 21 of a seat load measuring hub 20 in response to a predetermined instruction by a service person.

FIG. 3 is a diagram for illustrating the principles of the invention. When installing a seat assembly (not shown) that includes the seat load measuring system in a vehicle under manufacturing is completed, an initial setting of the correction value W0+W1 is executed in each weight sensor assembly. Specifically, an attendant enters a zero point adjusting command from command input device 90. The zero adjustment command is received by CPU 21, which in turn transfers the zero point adjusting command to each weight sensor assembly 10. In response to a reception of the zero point adjusting command, controller 16 of each weight sensor assemblies 10 executes a zero point adjusting operation as shown in FIG. 4. In FIG. 4, controller 16 measures the amplifier 15 output W−Wc=W1 (memory 17 contains −W0 as −Wc at this initial setting stage) without applying a load to the seat in step 161 and stores an initial correction value −(W0+W1) in memory 17 in step 162.

If a vehicle should experience a minor crash, which can cause the zero point to deviate from the current value W0+W1 to a new value W0+W2, then the user will take the vehicle to an auto repair shop. The attendant or repairman connects the command input device 90 to load measuring hub assembly 20 to enter the zero point adjusting command. Responsively, the zero point adjusting operation is executed in the above-described manner. In this case, since the no-load amplifier 15 output W2 is measured in step 161, controller 16 stores the new value −(W0+W2) in memory 17.

Accordingly, even if the zero point of a weight sensor 10 should deviate from the current value W0+W1 to the new value W0+W2, once the zero point is adjusted at the auto repair shop as described above, the amplifier 13 output W is corrected with the new value W0+W2, resulting in each weight sensor assembly 10 yielding a correct output $W-(W0+W2)=(W0+W2+W_{LD})-(W0+W2)=W_{LD}$.

Further, controller 16 may be so arranged as to output an alert signal or message if the no-load amplifier 15 output W2 in step 161 exceeds a predetermined allowable maximum zero point value W0max. In this case, the alert signal or message is passed to CPU 21 of load measuring hub assembly 20 and then to command input device 90, which in turn displays a message to the effect that the correction value W0+W2 exceeds the predetermined allowable maximum value while providing a predetermined alert sound. The alert message preferably includes an ID of the alerting weight sensor assembly 10, which enables command input device 90 to display which of the four weight sensor assemblies is alerting.

In the above embodiment, load measuring hub assembly 20 and air bag controller 30 are separately implemented. However, they are embodied as a single module by incorporating the functions of CPU 21 into the controller 31. In this case, communication interfaces 23 and 33 can be eliminated. This enables reductions in the size, the weight and the price of the seat load measuring system.

Figure 5:
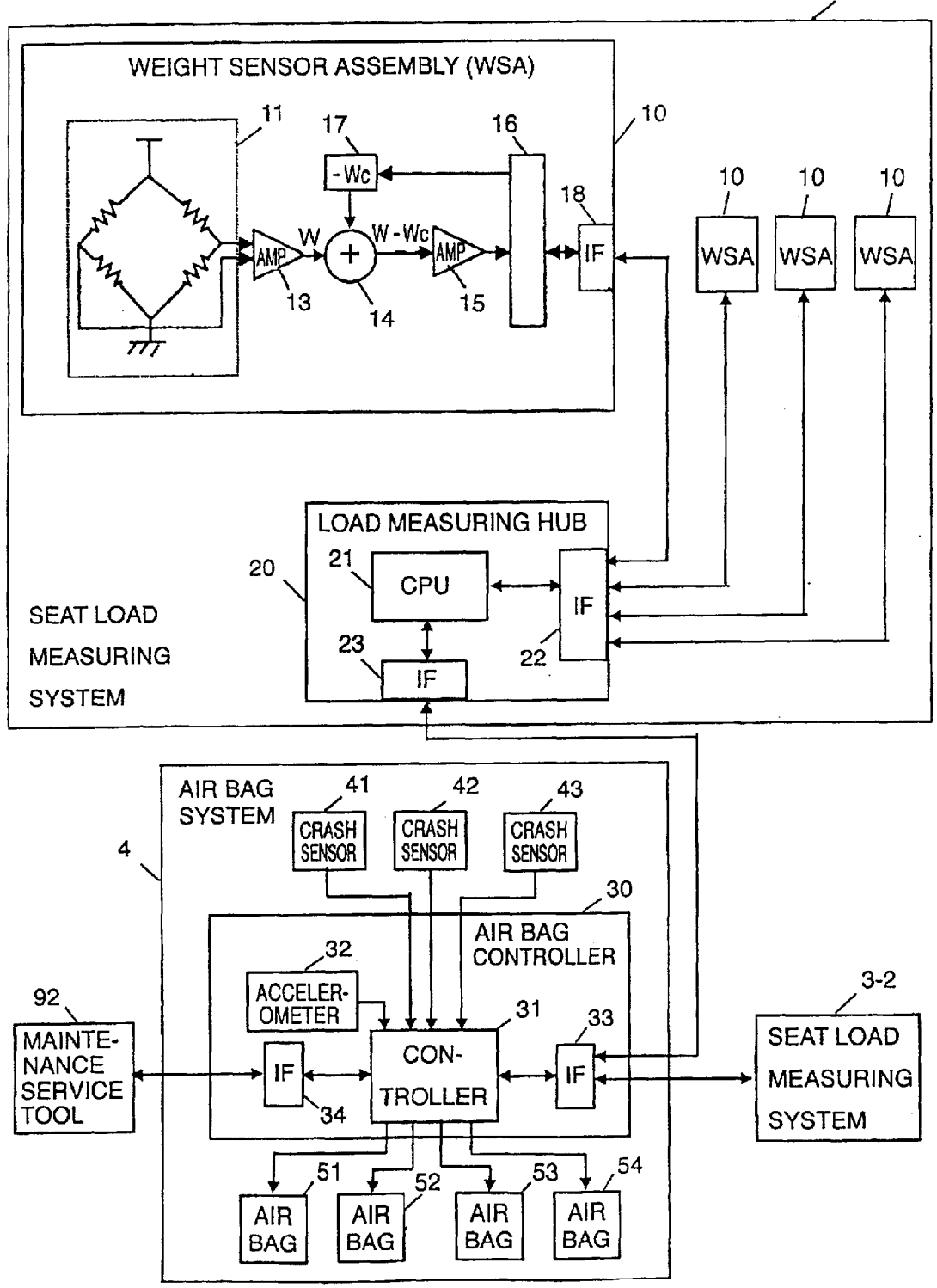
FIG. 5 is a block diagram showing a second exemplary zero point adjusting arrangement including an air bag system using a seat load measuring system capable of adjusting its zero point in accordance with a second illustrative embodiment of the invention.

FIG. 5 is a block diagram showing a second exemplary zero point adjusting arrangement including an air bag system using a seat load measuring system capable of adjusting its zero point in accordance with a second illustrative embodiment of the invention. In other words, FIG. 5 shows an example in which seat load measuring system 3 of FIG. 2 is used for an air bag system. In FIG. 5, the Zero point adjusting arrangement 2 comprises an air bag system 4; two seat load measuring systems 3-1 and 3-2 which are connected to air bag system 4 which are installed into the driver's seat (not shown) and the assistant driver's seat (not shown) for example; and maintenance service tool 92 which serves as a command input device.

Air bag system 4 comprises crash sensors 41 through 43 for detecting a crash; air bag controller 30 for controlling the deployment of the air bags; and front and side air bags 51 and 52 for the not-shown driver's seat and front and side air bags 53 and 54 for the not-shown assistant driver's seat. Air bag controller 30 comprises accelerometer 32 for measuring the acceleration; CPU-based controller 31; communication interface 33 to which two seat load measuring systems 3-1 and 3-2 are connected; and service tool interface 34 to which maintenance service tool 92 is connected.

The zero point adjusting operation of zero point adjusting arrangement 2 is identical to that of zero point adjusting arrangement 1 except for the route of the zero point adjusting command. Specifically, a zero point adjusting command entered by the attendant through service tool 92 is passed to controller 31 via interface 34, to CPU 21 via interfaces 33 and 23, and then to controller 16 via interfaces 22 and 18. The operation of controller 16 is identical to that described in connection with FIG. 2. If controller 16 issues the above-mentioned alert message, then the alert message is transmitted along the opposite route.

In order to enable the above operation, air bag controller 30 has to be so arranged that if controller 31 receives first data indicative of a zero point adjusting request, then controller 31 passes second data of the zero point adjusting request to controller 16. The first and second data may be either identical to or different from each other.

Figure 6:
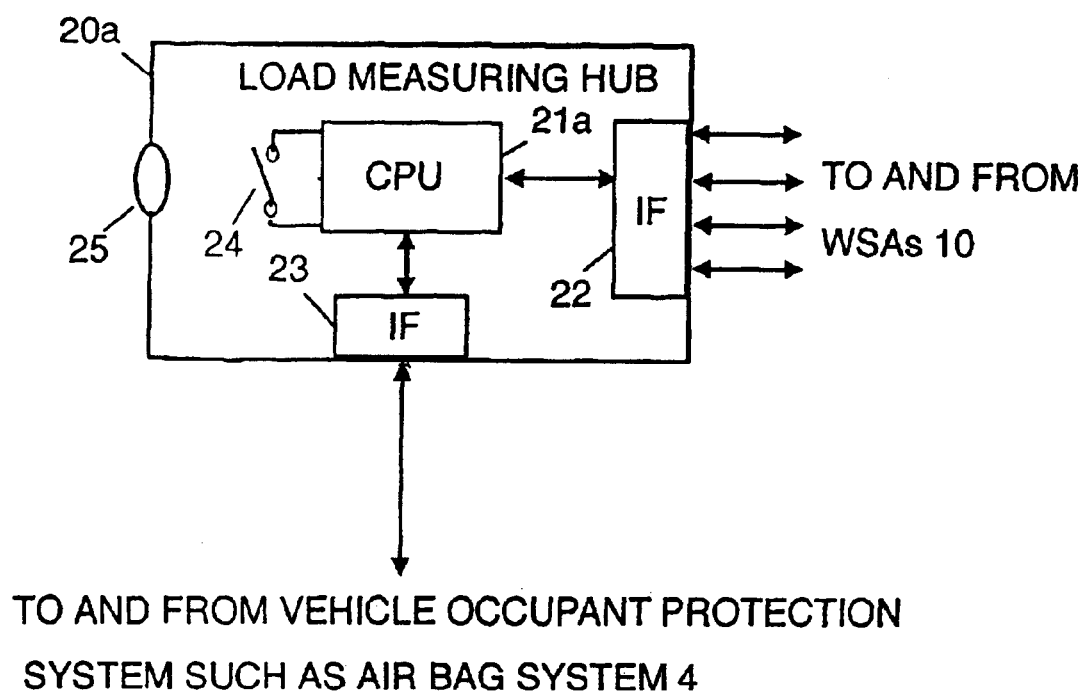
FIG. 6 is a block diagram showing an exemplary modification of the seat load measuring hub assembly of FIGS. 2 and 5.

In the above embodiments, command input device 90 or maintenance service tool 92 is used as command input means. Alternatively, load measuring hub assembly 20 may be provided with a kind of switch as zero point adjusting command input means as shown in FIG. 6. In FIG. 6, load measuring hub assembly 20a is identical to that of FIG. 2 or 5 except that CPU 21 has been replaced with CPU 21a and momentary switch 24 having the terminals connected to CPU 21a and opening 25 provided in the enclosure of load measuring hub assembly 20a have been added.

In this embodiment, if the attendant desires to cause a set of four weight sensor assemblies to execute zero point adjusting operation, he or she has only to make switch 24 on, for example, by pushing the switch 24 button (not shown) through opening 25 with a rod. This embodiment needs any other input means for the zero point adjustment. As long as this type of hub assembly 20a is used, an occupant protection system configured as shown in FIG. 5 can have any configuration. In other words, air bag system controller 30 has no longer to be specially arranged in order to relay the zero point adjusting command from service tool 92 to load measuring hub assembly 20a.

Many widely different embodiments of the present invention may be constructed without departing from the spirit and scope of the present invention. It should be understood that the present invention is not limited to the specific embodiments described in the specification, except as defined in the appended claims.

What is claimed is:

1. An occupant protection system of a vehicle, including:
   a seat load measuring subsystem for providing information depending on a weight of an occupant of a vehicle seat, said seat load measuring subsystem comprising:
      a plurality of weight sensor assemblies each for providing a first output indicative of a weight component of said occupant which is applied to each of the weight sensor assemblies; and
      hub means for collecting said first outputs and providing said information;
   an air bag system comprising:
      a crash sensor for detecting a crash of the vehicle; and
      an air bag controller operatively connected to the hub means, the air bag, and the crash sensor for operating an air bag as well as a detection of an occurrence of the crash detected by the crash sensor; and
      communication means operatively connected to the air bag controller for communicating a user's command for re-adjustment of each weight sensor assembly to the air bag controller,
      wherein said air ban controller controls a detection of the operated air bag on the basis of the information provided by the hub means and, when the user's command is communicated from the communicating means, relays the user's command to the hub means,
      said hub means transfers the user's command to each weight sensor assembly, and
      wherein each of said weight sensor assemblies includes means responsive to a reception the user's command transferred from the hub means for executing the re-adjustment operation.

2. An occupant protection system as defined in claim 1, wherein said means for executing the re-adjustment operation includes means for providing an alert if a zero point of said weight sensor assembly is not within a predetermined range.

3. The occupant protection system as defined in claim 1, wherein said communication means comprises:

an interface connectable to a maintenance service tool so that, after the vehicle is crashed, said maintenance service tool being configured to permit the user to enter the user's command through the communication means to the air bag controller.

4. The occupant protection system as defined in claim 1, wherein said means for communicating the user's command for the re-adjustment operation comprise a momentary switch electrically connected to the hub means transferring an operation switch thereof as the user's command to the hub means.

5. The occupant protection system as defined in claim 1, wherein each of said weight sensor assemblies comprises:

a weight sensor for generating an output voltage indicative of the weight component of said occupant;

a first operational amplifier for amplifying the output voltage from the weight sensor to an appropriate level;

a memory for storing an initial sign-inverted offset voltage for use in a correction of the output voltage from the first operational amplifier;

an adder for adding the stored offset voltage to the output voltage to output a zero-adjusted voltage;

a second operational amplifier for amplifying the outputted zero-adjusted signal to output the amplified zero-adjusted voltage; and a controller operatively connected to the hub means, said controller, when the user's command is transferred from the hub means, measuring the zero-adjusted voltage without applying a load to the vehicle seat, and newly storing the measured zero-adjusted voltage as the initial offset voltage in the memory.

* * * * *